United States Patent
Hakarine

[11] Patent Number: 6,146,784
[45] Date of Patent: Nov. 14, 2000

[54] VENT PLUG HAVING AN INTEGAL SEAL

[75] Inventor: Duane D. Hakarine, Brandon, Miss.

[73] Assignee: GNB Technologies, Inc., Mendota Heights, Minn.

[21] Appl. No.: 09/175,746

[22] Filed: Oct. 20, 1998

[51] Int. Cl.⁷ .................................................. H01M 2/12
[52] U.S. Cl. .......................... 429/82; 429/89; 429/53; 429/54; 429/55; 429/72
[58] Field of Search .................. 429/53, 54, 55, 429/57, 79, 82, 89, 72, 175

[56] References Cited

U.S. PATENT DOCUMENTS

| | | | |
|---|---|---|---|
| 1,190,654 | 7/1916 | Kammerhoff. | |
| 2,690,466 | 9/1954 | Kendall et al. | 136/178 |
| 2,690,467 | 9/1954 | Kendall | 136/178 |
| 4,078,121 | 3/1978 | Gratzmuller | 429/54 |
| 4,131,722 | 12/1978 | Sugalski | 429/55 |
| 4,209,572 | 6/1980 | Reissland | 429/53 |
| 4,338,382 | 7/1982 | Fritts | 429/53 |
| 5,217,823 | 6/1993 | Geibl et al. | 429/55 |
| 5,258,243 | 11/1993 | Cannone | 429/55 |
| 5,422,199 | 6/1995 | Adams et al. | 429/88 |

*Primary Examiner*—Maria Nuzzolillo
*Assistant Examiner*—Angela J. Martin
*Attorney, Agent, or Firm*—Leydig, Voit & Mayer, Ltd.

[57] ABSTRACT

The present invention provides for a wet, multicell, lead-acid electric storage battery comprising a venting system having vent plugs comprising an inventive sealing arrangement. Specifically, the vent plugs provide a seal to be molded onto the vent body as a permanently attached feature. The present invention consequently eliminates the need to separately manufacture and apply a gasket to a vent body, thus reducing manufacturing costs and greatly improving reliability and safety during both use and handling.

11 Claims, 2 Drawing Sheets

VENT PLUG HAVING AN INTEGAL SEAL

FIELD OF INVENTION

This invention relates generally to absorbed electrolyte batteries and, more particularly, to a vent plug having an integral seal for use with such batteries.

BACKGROUND OF THE INVENTION

Typically, wet, multicell, lead-acid SLI storage batteries include an open-topped, rectangular-shaped container which is sealed by a cover assembly, both of which are formed from an injection molded thermoplastic polymer, such as polypropylene. The container and cover have partition walls which divide the space within the battery into a plurality of substantially isolated cell cavities. Each cell cavity contains an electrode stack which is immersed in electrolyte. The cover typically defines a plurality of generally cylindrically shaped process holes, one associated with each cell cavity, through which the cell cavities are initially filled with electrolyte. In maintenance batteries, the process holes are closed-off by plugs which can be removed so that electrolyte can be periodically added through the process holes as maintenance is required.

Especially during charging, lead-acid storage batteries generate various gases in the cell cavities during operation, including hydrogen and oxygen. Hydrogen/oxygen mixtures can be volatile, creating an obvious potential for explosion. In recombinant lead-acid batteries, hydrogen and oxygen gas is retained in large part in the battery and induced to recombine into water. In wet lead-acid storage batteries, however, such gases are allowed to escape from the cell cavity and ultimately pass out of the battery through a venting system.

Wet, lead-acid storage batteries are used in a tremendous variety of vehicles and applications. As a result, such batteries are often subject to extreme and harsh operating environments. For example, batteries used in land moving vehicles, such as bulldozers, are frequently tilted at severe angles, as well as being subjected to intense operating vibrations. Thus, electrolyte can splash about the interior of a battery during normal battery use, as well as during installation and shipment.

There are a wide variety of known venting systems for expelling the volatile gases generated within a wet battery to the external, ambient space. The electrochemical performance of the battery may suffer, however, if electrolyte leaks from the battery. Accordingly, in general, venting systems in wet lead-acid batteries are directed to achieving a dual purpose: allowing gases to vent from within the battery, while retaining the electrolyte fluid therein.

Venting systems typically utilize venting plugs which are adapted for insertion within each process hole. A baffle positioned within the venting plug allows the passage of gases from the cell cavity while retarding the passage of electrolyte. Positioned between the venting plug and the process hole is a gasket, which provides a seal that prevents passage of gases and liquid between the plug and process hole.

Prior art vent plugs frequently utilize a separate gasket which is placed over the end of the plug body. Such gaskets are typically formed from die cutting molded sheet stock or by cutting molded tubes of rubber. Unfortunately, this method of production is costly. Specifically, it is relatively expensive to mold and cut a separate gasket. Moreover, affixing the gasket to the vent body is labor intensive and unreliable. For instance, the gasket may be affixed incorrectly, not affixed at all, or may fall off in handling or shipment thus resulting in a complete loss of effectiveness of the vent plug.

Other prior art plugs utilize an integrally molded annular bead to serve as the seal between the plug and the process hole. A single material is used for both the plug body and the bead. U.S. Pat. No. 5,422,199, for example, discloses such a plug and bead combination.

Unfortunately, this design also has significant drawbacks, namely poor sealing characteristics. Vent plugs are typically molded of a relatively rigid material such as polypropylene. Although this material is satisfactory for the plug body, it is relatively non-resilient, and, accordingly, can result in relatively poor sealing characteristics.

Despite the continuing effort in this area there remains a need for vent plugs that efficiently retain electrolyte within the cell cavity while effectively venting gases in a relatively safe manner, and which can be easily and economically manufactured.

Accordingly, it is a primary object of the present invention to provide a vent plug which is easily and economically manufactured. It is a related object to provide a vent plug which minimizes fabrication and assembly costs, while providing a consistent, reliable venting device.

A more specific object of the invention is to provide a vent plug which provides an effective seal between the vent body and container cover.

It also is an object to provide a battery which vents gases generated with the cell cavities in a safe and efficient manner.

Another object of the present invention is to provide a battery having a venting system that minimizes the escape of electrolyte.

Yet another object is to provide a battery wherein all of the above advantages are realized.

Additional objects, advantages and other novel features of the invention will be set forth in part in the description that follows and in part will become apparent to those skilled in the art upon examination of the following or may be learned with the practice of the invention.

SUMMARY OF THE INVENTION

The present invention provides-an economically manufacturable vent plug for a wet, lead-acid storage battery which provides a leak-proof seal between the vent body and the battery cover, while allowing the effective venting of volatile gases from the interior of the battery. A wet, multicell, lead-acid electric storage battery typically comprises a container, a cover, one or more partition walls dividing the space within the container and cover into two or more cell cavities. The cover defines generally cylindrically shaped process holes associated with each cell cavity. The battery further comprises a venting system having vent plugs associated with each process hole and adapted for insertion therein.

A venting plug comprises a generally cylindrical side wall, a closed upper end, and an open lower end. The venting plugs are adapted to allow the passage of gases and to retard the passage of electrolyte from the cell cavity. Specifically, the vent plugs provide a seal to be molded onto the vent body as a permanently attached feature.

The present invention consequently eliminates the need to separately manufacture and apply a gasket to a vent body, thus reducing manufacturing costs. Moreover, because the seal is molded directly to the vent plug body, maximum contact area between the seal and the body provides superior adhesion between the seal and the body, greatly improving reliability and safety.

DETAILED DESCRIPTION OF THE PREFERRED EMBODIMENTS

Figure 1:
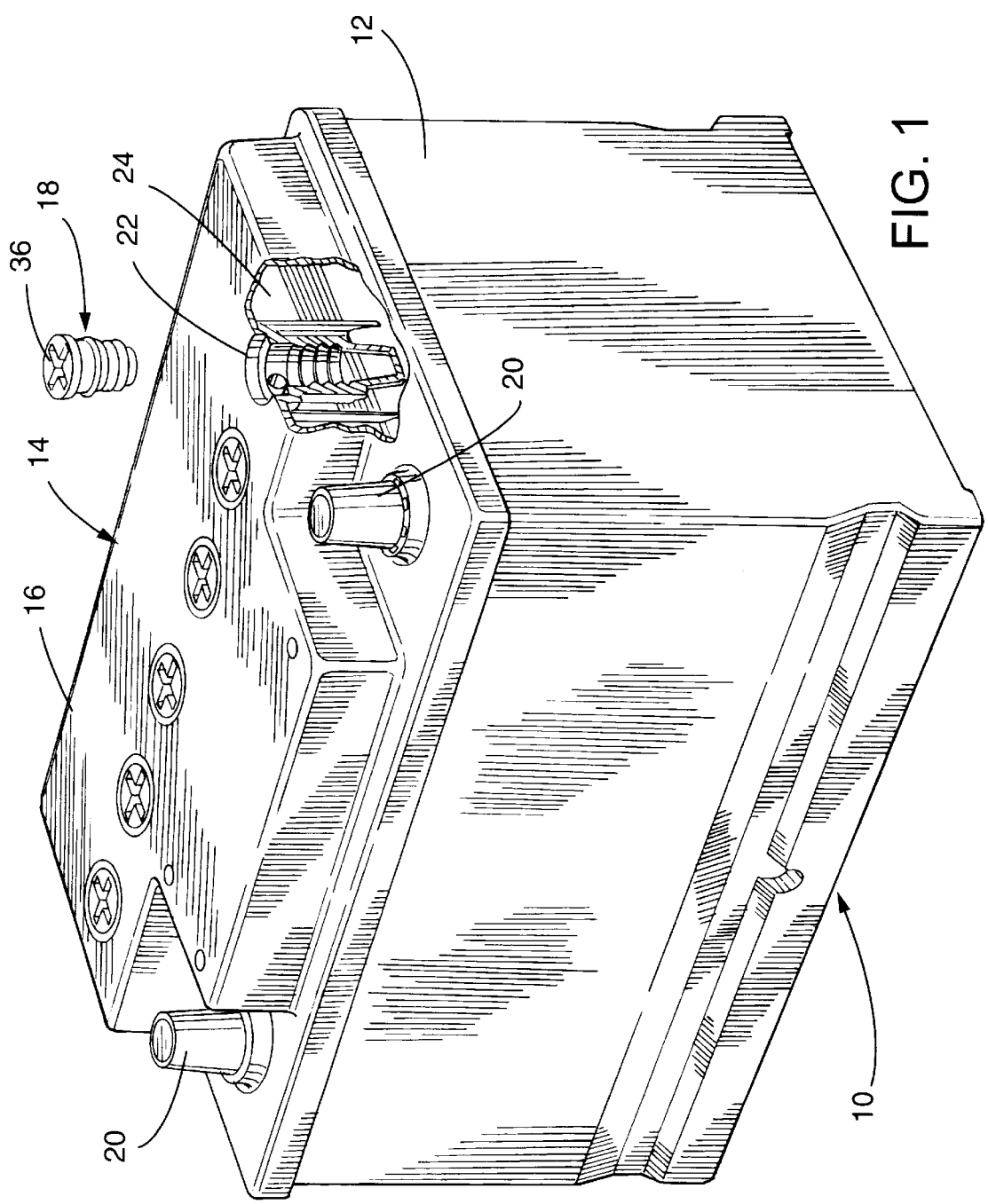
FIG. 1 is a battery assembly, partially cut away to show a processing hole, the associated venting plug being removed.

Referring now to FIG. 1, a preferred embodiment of the wet, multicell lead-acid SLI batteries of the subject invention is shown and is generally designated by reference numeral 10. The battery 10 is constructed of a rectangular open container 12, to which is sealed a cover assembly 14. Two terminal posts 20 are also mounted in and extending through the cover 16.

While not visible in this illustration, the interior of the battery 10 is divided into a plurality of separate cell cavities, in this embodiment, six. Those cell cavities, also referred to as cells, house a plurality of series-connected electrode stacks 24.

A process hole 22 is provided in and defined by the cover 16 for each individual cell thereunder. The process holes 22 have a generally cylindrical shape and allow access to the individual cells, so that each cell can be filled with liquid electrolyte, usually a dilute sulfuric acid, during manufacture of the battery.

In order to allow for the escape of gases generated during the charging cycle of lead-acid batteries, the cover comprises a venting system which includes a plurality of venting or vent plugs 18 for venting gases from within the battery 10 while hindering the escape of electrolyte. The plurality of venting plugs 18 are adapted for insertion into the process holes 22 so as to substantially close the process holes 22. The venting plugs 18 can be removed, however, so that water may be periodically added to maintain the proper level of electrolyte within the cells.

Referring to FIGS. 2–5, more detailed views of the venting plugs of the present invention are shown. The body portion 28 preferably is formed as a unitary, generally cylindrical piece. The body portion 28 includes a cylindrically-shaped side wall closed off by a top 19 at its upper end and open at its lower end, whereby the side wall and top of the body portion 28 define a generally cylindrical, central cavity (not visible). It will be appreciated by those skilled in the art that any appropriate venting structure may be provided in the interior of the cavity to provide desired venting characteristics to the vent plug 18.

In the preferred embodiment, threads 30 on the body portion 28 engage corresponding threads on the inner surface of the process hole 22 to facilitate frictional engagement of the venting plug 18 in the process hole 22. It should be appreciated, however, consistent with the teachings of the present invention, that a non-threaded plug could be utilized with equal success. In such an embodiment, retentive frictional engagement between the venting plug 18 and the process hole 22, may be provided by a pressure-fit engagement between the two contacting surfaces.

Threaded insertion of the venting plug 18 into the process hole 22 preferably is facilitated by driving slots 36. More particularly, the top 19 of the venting plug 18 includes driving slots 36 adapted to receive a driving tool, such as a screwdriver, for rotatably inserting the venting plug 18 into the process hole 22. The driving slots 36 may be of any configuration suitable for such purposes.

In accordance with the invention, the venting plug 18 is provided with an integral seal 38 that is molded to the plug 18. As may be seen in FIG. 2, the seal 38 is molded on the undersurface of the top 19 of the plug 18 and around the upper perimeter of the plug body 28. According to an important feature of the invention, the seal 38, although an integral component of the vent plug 18, is made of a material more resilient than that of the plug body 28 such that the seal 38 is elastically deformable.

Upon complete seating of the venting plug 18 within the process hole 22, the seal 38 abuts a corresponding portion of the process hole 22. The seating force generated by the threaded insertion of the venting plug 18 causes the seal 38 to deform, creating a seal between the plug and the process hole 22. It will thus be appreciated that the seal 38 serves to reduce or eliminate undesired fluid leakage between the outer surface of the venting plug 18 and the process hole 22.

It will further be appreciated by those skilled in the art that molding the seal 38 directly to the vent body 28 facilitates the incorporation of a seal design which enhances both the sealing function, as well as adhesion between the seal 38 and the body 28. Gaskets typically utilized in conventional venting plugs generally have a very simple cross-section, this is because the gasket must be assembled and coupled to the vent plug body with minimal opportunity for canting, twisting, or the like, which might interfere with the sealing properties. Additionally, as the gasket is separately molded, the design must be simple in order to minimize the opportunity for tearing or surface damage during the molding and assembly processes which likewise might interfere with the gasket's sealing properties. Accordingly, separately molded gaskets typically have a round or rectangular cross-section.

Figure 2:
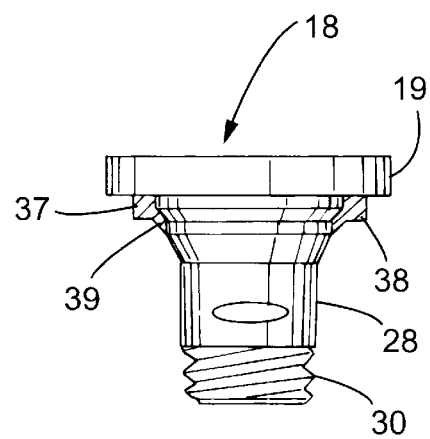
FIG. 2 is a side elevation of a vent plug constructed in accordance with the teachings of the invention.

The preferred embodiment of the present invention includes a molded seal 38 that enhances both its ultimate sealing function, as well as adhesion of the seal 38 to the vent body 28 during the molding process. As illustrated in FIG. 2, the seal 38 preferably comprises a main body portion 37, and an elongated apron portion 39. In this way, the seal 38 extends along and adheres or bonds to a substantial surface area of both the underside of the vent top 19, as well as the vent body 28. As a result, the seal 38 is permanently and securely attached to the vent body 28.

Additionally, it will be appreciated that the length of seal 38 cross-section acts to enhance sealing properties as it provides a longer seal between the body 28 and the hole 22. Further, the apron portion 39 acts a lead to ensure optimal positioning of the seal 38 within the processing hole 22.

The venting plug 28 constructed according to teachings of the present invention may be readily fabricated from materials that are known in the art. The plug body 28, for example, may be injection molded from a thermoplastic polymeric material, such as polypropylene, which is commonly used to manufacture battery components. The integral vent plug seal 38 may also be fabricated from an injection molded thermoplastic polymeric material which is resistant to corrosion or degradation due to the gases and fluids contained within the battery container 12.

According to an important feature of the invention, however, the polymeric material of the seal 38 will necessarily have a greater resiliency than that used for the plug body. Further, inasmuch as the seal 38 must be securely retained within the plug body 28 as a result of the molding process, the polymeric material of the seal likewise preferably provides good adhesive properties. Santoprene™ has proven particularly effective in providing sufficient resiliency to properly seal the plug and process hole while likewise providing good adhesive characteristics. The Santoprene™ elastomer bonds to the polypropylene material over the vent body 28, ensuring that the seal 38 is permanently attached.

Figure 3:
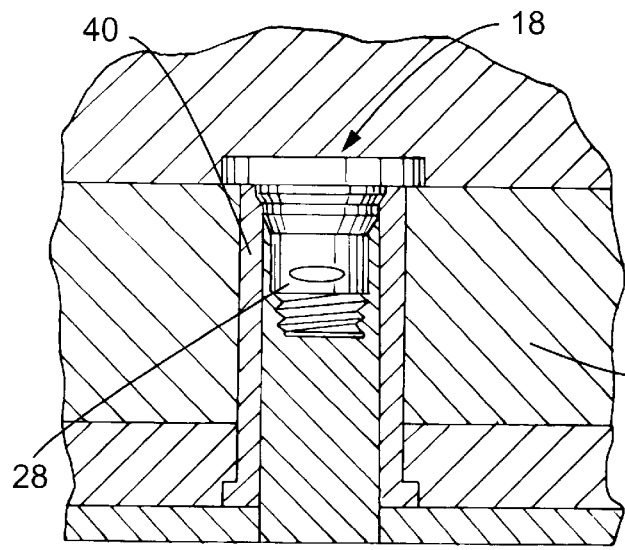
FIG. 3 is a cross-sectional view of a multipart, multiposition mold at the position in which a vent plug body is to be molded, and illustrating the same.
Figure 4:
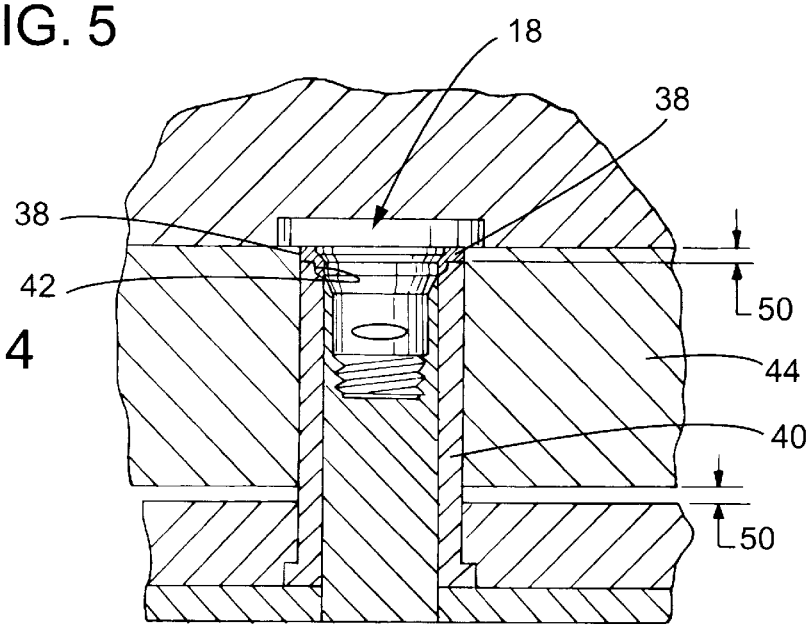
FIG. 4 is a cross-sectional view of the mold of FIG. 3 at the position in which a seal is molded to the vent plug body in accordance with teachings of the invention, and illustrating the same.

The integral seal 38 may be manufactured in a number of ways. One method of manufacture that has been found particularly advantageous is to form the vent plug body 28 and integral seal 38 in a multicomponent, multiposition mold. For instance, as illustrated in FIGS. 3 and 4, the injection mold may utilize parallely disposed movable slide 40. It will be appreciated that the slide 40 is an annularly shaped mold component. As shown in FIG. 3, the plug body 28 is first molded of a first material, such as polypropylene. The mold slide 40 are then retracted a distance 50 to the position illustrated in FIG. 4, creating an annular cavity 42 between the outer surface of the plug body 28, the slide 40, and the lower mold half 44. A second polymeric material is then injected into the cavity 42 to form the integral seal 38, as illustrated in FIG. 4.

Figure 5:
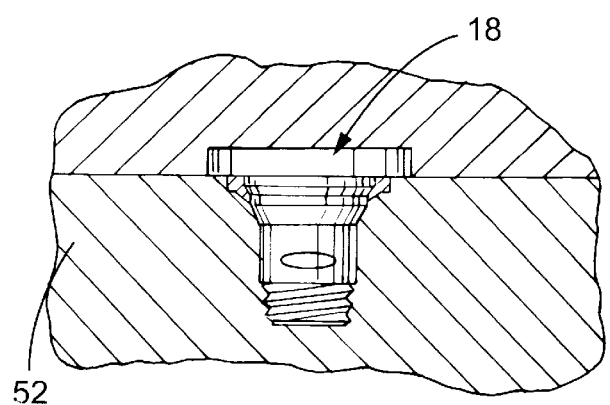
FIG. 5 is a cross-sectional view of a second type of mold to be used for molding a seal on a vent plug in accordance with the teachings of the invention.

Alternatively, the vent plug body 28 may be molded by conventional means and then transferred to a second mold 52. The seal 38 may then be injection molded onto the valve body 28 as illustrated in FIG. 5. While it is anticipated that, in the preferred embodiment of the invention, the seal 38 will be molded directly to the plug body 28 and vent top 19 without additional preparation to the surface of the body 28, it will be appreciated that an adhesive or the like may be applied to the surfaces of the plug 18 along which the seal 38 is to be molded in order to enhance adhesion of the second polymeric material to the plug 18.

The present invention allows a seal to be molded onto the vent body as a permanently attached feature. The present invention consequently eliminates the need to separately manufacture and apply a gasket to a vent body, thus saving significant cost and greatly improving reliability and safety, effectively eliminating the possibility of the seal becoming dislodged from the vent body during handling or usage. Additionally, the integral seal is made of a resilient material that deforms between the vent body and the process hole to seal the passageway, thus preventing leakage of gases and electrolyte from the cell cavity.

I claim:

1. A venting plug for use with a wet, lead-acid electric storage battery comprising a container and a cover defining at least one cavity, the cover defining at least one cylindrically shaped process hole associated with said cavity, said venting plug being adapted for insertion into said process hole to provide gaseous communication between said cavity and the atmosphere, the venting plug comprising:

a body being made of a first material and having a cylindrical portion and a top portion, said cylindrical portion having an upper end and a lower end, said upper end being closed off by the top portion and said lower end being open;

an integrally molded seal being made of a second material and being disposed circumferentially about said upper end and subjacent said top, said seal being molded directly to the body such that said seal adheres to the body, the seal being elastically deformable in a passage between the body and the process hole to seal the passage.

2. The venting plug as in claim 1 wherein said first material is more rigid than said second material.

3. The venting plug as in claim 2 wherein said first material is polypropylene.

4. The venting plug as claim in claim 2 wherein the second material is an elastomeric material.

5. The venting plug as in claim 3 wherein said second material is a thermoplastic elastomeric material comprising an alloy of cured ethylene propylene diene monomer rubber and polypropylene.

6. The venting plug as in claim 1 wherein said body and said integrally formed seal are injection molded together in a multiposition mold assembly.

7. The venting plug as in claim 1 wherein said body is molded in a first mold and said seal is subsequently injection molded onto said body in a second mold.

8. The venting plug as claimed in claim 1 wherein the seal comprises a body portion and an elongated apron portion extending from the body portion.

9. The venting plug as claimed in claim 8 wherein the body portion is disposed about the circumference of the cylindrical portion of the body subjacent to the top, and the elongated apron portion extending along the cylindrical portion.

10. The venting plug as claimed in claim 9 wherein the body portion of the seal is molded and adheres to a lower surface of the top and a circumferential surface of the cylindrical portion of the body, and the apron portion of the seal adheres to the circumferential surface of the cylindrical portion of the body subjacent the body portion of the seal.

11. A wet, lead-acid storage battery comprising a container and a cover defining at least one cavity, the cover defining at least one cylindrically shaped process hole associated with said cavity, and venting plug being adapted for insertion into said process hole to provide gaseous communication between said cavity and the atmosphere, the venting plug comprising:

a body being made of a first material and having a cylindrical shape, said body having an upper end and a lower end, said upper end being closed off by a top portion and said lower end being open;

a seal being made of an elastomeric material and being disposed circumferentially about said upper end of said body and subjacent said top, said seal being molded directly to the body such that said seal adheres to the body, the seal being elastically deformable in a passage between the body and the process hole to seal the passage.

* * * * *

UNITED STATES PATENT AND TRADEMARK OFFICE
CERTIFICATE OF CORRECTION

PATENT NO. : 6,146,784
DATED : November 14, 2000
INVENTOR(S) : Hakarine, Duane D.

It is certified that an error appears in the above-identified patent and that said Letters Patent is hereby corrected as shown below:

The title reads "VENT PLUG HAVING AN INTEGAL SEAL".

The title should read "VENT PLUG HAVING AN INTEGRAL SEAL".

Signed and Sealed this

First Day of May, 2001

*Attest:*

NICHOLAS P. GODICI

*Attesting Officer*   *Acting Director of the United States Patent and Trademark Office*